(12) United States Patent
White et al.

(10) Patent No.: US 11,396,619 B2
(45) Date of Patent: Jul. 26, 2022

(54) PHASE-CHANGE MATERIAL AND METHOD FOR PRODUCING SAME

(71) Applicants: Mary Anne White, Halifax (CA); John Alexander Noël, Grand Bend (CA)

(72) Inventors: Mary Anne White, Halifax (CA); John Alexander Noël, Grand Bend (CA)

(*) Notice: Subject to any disclaimer, the term of this patent is extended or adjusted under 35 U.S.C. 154(b) by 300 days.

(21) Appl. No.: 16/734,088

(22) PCT Filed: Jun. 12, 2018

(86) PCT No.: PCT/CA2018/050704
§ 371 (c)(1),
(2) Date: Jan. 3, 2020

(87) PCT Pub. No.: WO2019/010565
PCT Pub. Date: Jan. 17, 2019

(65) Prior Publication Data
US 2020/0190382 A1  Jun. 18, 2020

Related U.S. Application Data

(60) Provisional application No. 62/530,494, filed on Jul. 10, 2017.

(51) Int. Cl.
| | | |
|---|---|---|
| C09K 5/06 | (2006.01) | |
| C04B 35/10 | (2006.01) | |
| C04B 35/46 | (2006.01) | |
| C04B 35/52 | (2006.01) | |
| C04B 38/00 | (2006.01) | |
| C04B 38/06 | (2006.01) | |

(52) U.S. Cl.
CPC ............. *C09K 5/063* (2013.01); *C04B 35/10* (2013.01); *C04B 35/46* (2013.01); *C04B 35/52* (2013.01); *C04B 35/522* (2013.01); *C04B 38/0038* (2013.01); *C04B 38/0605* (2013.01); *C04B 2235/3217* (2013.01); *C04B 2235/3232* (2013.01); *C04B 2235/424* (2013.01); *C04B 2235/425* (2013.01)

(58) Field of Classification Search
CPC ......... C09K 5/063; C04B 35/10; C04B 35/46; C04B 35/52; C04B 35/522; C04B 38/0038; C04B 38/0605; C04B 2235/3217; C04B 2235/3232; C04B 2235/424; C04B 2235/425; C04B 2103/0071; C04B 2235/5445; C04B 2235/5454; C04B 2235/5472; C04B 2235/9607; C04B 35/111; C04B 35/117; C04B 35/528; C04B 35/62655; C04B 35/632; C04B 35/6265
USPC ..................................................... 252/71
See application file for complete search history.

(56) References Cited

U.S. PATENT DOCUMENTS

| | | | |
|---|---|---|---|
| 2007/0222112 A1* | 9/2007 | Christ | C09K 5/063 264/259 |
| 2012/0196040 A1 | 8/2012 | Wilk, Jr. et al. | |
| 2016/0221262 A1* | 8/2016 | Das | B33Y 30/00 |
| 2016/0319174 A1* | 11/2016 | Razack | B05D 1/18 |
| 2017/0136708 A1* | 5/2017 | Das | B29C 64/135 |
| 2018/0298261 A1* | 10/2018 | Razack | C08L 101/00 |
| 2019/0091988 A1* | 3/2019 | Das | B33Y 50/02 |

FOREIGN PATENT DOCUMENTS

| | | |
|---|---|---|
| CN | 102827587 A | 12/2012 |
| CN | 105293483 A | 2/2016 |
| CN | 105836738 A | 8/2016 |
| CN | 106497519 A | 3/2017 |
| CN | 106517901 A * | 3/2017 |
| EP | 1837385 A2 | 9/2007 |
| JP | S4819843 B1 | 6/1973 |
| JP | S6357351 U | 4/1988 |
| JP | 2001192280 A | 7/2001 |
| JP | 2004018361 A | 1/2004 |
| JP | 2007269940 A | 10/2007 |
| JP | 2016081978 A | 5/2016 |
| KR | 20120041629 A | 5/2012 |
| KR | 101372464 B1 | 3/2014 |
| WO | 2015095271 A1 | 6/2015 |
| WO | 2015109272 A1 | 7/2015 |
| WO | 2016165999 A1 | 10/2016 |

OTHER PUBLICATIONS

Translation of CN 106517901 A, Mar. 22, 2017. (Year: 2017).*
Chinese Patent Application No. CN201880459502, Office Action dated Feb. 1, 2021—English Translation Not available.
European Patent Application No. 18832044.4, Extended European Search Report dated Feb. 25, 2021.
Akhiani et al., "One-Step Preparation of Form-Stable Phase Change Material through Self-Assembly of Fatty Acid and Graphene," Journal of Physical Chemistry C, Sep. 2015, vol. 119 (40), p. 22787-22796.
International Patent Application No. PCT/CA2018/050704, International Preliminary Report on Patentability dated Oct. 10, 2019.
International Patent Application No. PCT/CA2018/050704, International Search Report and Written Opinion dated Jul. 20, 2018.

(Continued)

*Primary Examiner* — Douglas J McGinty
(74) *Attorney, Agent, or Firm* — Borden, Ladner, Gervais, LLP; Geoffrey deKleine

(57) ABSTRACT

A method for producing a form-stable phase-change material includes freezing a slurry of solid and solvent to provide a frozen slurry, exposing the frozen slurry to conditions causing sublimation of the frozen solvent to remove solvent and provide a body having vacancies therein, sintering the body to provide a scaffold, and adding a molten phase-change material to the scaffold to provide the form-stable phase-change material. The same scaffold when ground acts as a phase-change nucleating aid.

16 Claims, 4 Drawing Sheets

(56) References Cited

OTHER PUBLICATIONS

Chinese Patent Application No. 201880045950.2, Office Action dated Aug. 16, 2021—English Translation Not available.
European Patent Application No. 18832044.4, Office Action dated Mar. 4, 2022.
Japanese Patent Application No. 2019-572814, Office Action dated Apr. 1, 2022—English Translation available.

* cited by examiner

PHASE-CHANGE MATERIAL AND METHOD FOR PRODUCING SAME

TECHNICAL FIELD

The present disclosure relates to phase-change material for use in, for example, insulating, thermal energy storage, or thermal management.

BACKGROUND

Phase-change materials absorb or release energy, in the form of heat, when the phase-change materials change phases. As a result, these materials are suitable for storing and releasing thermal energy. Such materials may be utilized in a wide variety of applications, for example, for insulating or thermal energy storage, or for thermal management, for example, in electronic applications.

Phase-change materials suffer from the disadvantage that packaging or encapsulation of such materials is expensive. Although the potential applications for such materials are extensive, the use of phase-change materials is limited by the cost. Phase-change materials also suffer from low thermal conductivity. Low thermal conductivity limits the rate at which heat can be brought into or out of the phase-change material.

Improvements in encapsulation and thermal conductivity of phase-change materials are desirable.

SUMMARY

According to an aspect of the present invention, a method for producing a form-stable phase-change material includes freezing a slurry of solid and solvent to provide a frozen slurry, exposing the frozen slurry to conditions causing sublimation of the solvent from the frozen slurry to provide a body having vacancies therein, sintering the body to provide a scaffold, and adding a molten phase-change material to the scaffold to provide the form-stable phase-change material.

The frozen slurry may be freeze-dried to cause sublimation of the frozen solvent.

A binder may be added to the slurry prior to freezing. The solvent utilized may be water.

Freezing is carried out directionally, for example, by pouring the slurry into a mold and placing the mold on a cold plate to provide a temperature gradient during freezing.

The body may include ceramic, carbon, metal, or a combination thereof.

The slurry includes one or more of binder, surfactant, dispersant, freezing point depressor, and structure modifier.

Optionally, the surface of the scaffold is functionalized or activated.

The scaffold may be heated while adding the molten phase-change material such that the temperature of the scaffold is greater than the melting point of the phase change material when the molten phase-change material is added to the scaffold.

Optionally, the molten phase-change material is added to the scaffold to provide the form-stable phase-change material by adding drops of molten phase-change material to the scaffold. The phase-change material may be added, for example, at atmospheric pressure, until saturation of the scaffold.

According to another aspect, a form-stable phase-change material includes a scaffold comprising a generally regular solid structure including vacancies having a phase-change material therein.

Optionally, the scaffold is ground and added directly to the phase-change material.

DRAWINGS

Embodiments of the present invention will be described, by way of example, with reference to the drawings and to the following description, in which.

DETAILED DESCRIPTION

Figure 1:
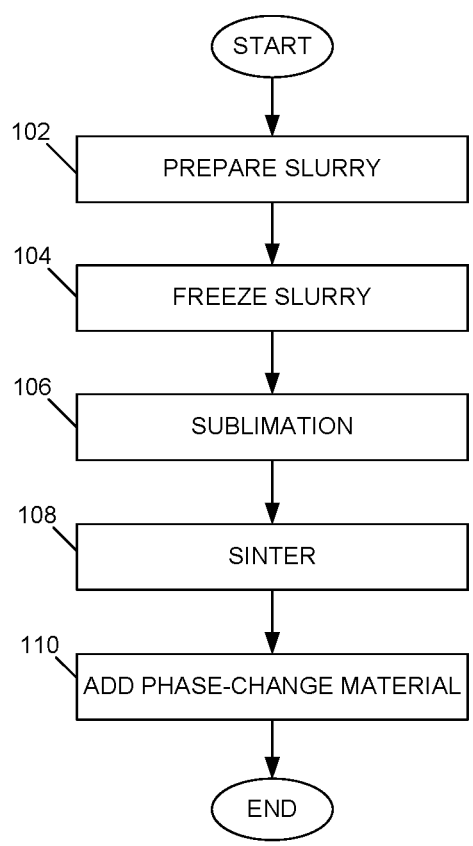
FIG. 1 is a simplified flow chart illustrating a method for producing a form-stable phase-change material according to an embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a method for producing a form-stable phase-change material. The method includes freezing a slurry of solid and solvent to provide a frozen slurry, exposing the frozen slurry to conditions causing sublimation of the frozen solvent to remove said solvent and provide a body having vacancies therein, sintering the body to provide a more rigid scaffold, and adding a molten phase-change material to the scaffold to provide the form-stable phase-change material.

Referring to FIG. 1, a flow chart illustrating a method for producing a form-stable phase-change material is shown. The method may contain additional or fewer processes than shown and described, and parts of the method may be performed in a different order.

A freeze-cast scaffold is prepared from a slurry. The slurry is first prepared at 102 and the basis of the slurry is solvent, such as distilled water. Additives, including one or more of binders, surfactants or dispersants, freezing point-depressors, and structure modifiers may be added to the solvent, and dissolved by stirring, with the application of heat. Solid particles of a solid material, such as a ceramic, carbon, metal, polymer, oxide, or other material, or a combination of materials, are added to the aqueous mix. The solid material is utilized to form the scaffold. The additives and quantities utilized are dependent on factors such as the desired structure and the solid particles' material.

The solution is stirred, for example, with a magnetic stir bar to suspend the particles and create a slurry. Depending on composition, a planetary mill may be utilized to aid suspension of the particles to create the slurry rather than a magnetic stir bar. The addition of a surfactant or other dispersant may also be utilized to aid the suspension of particles, and binders or other modifiers may be added.

Figure 2:
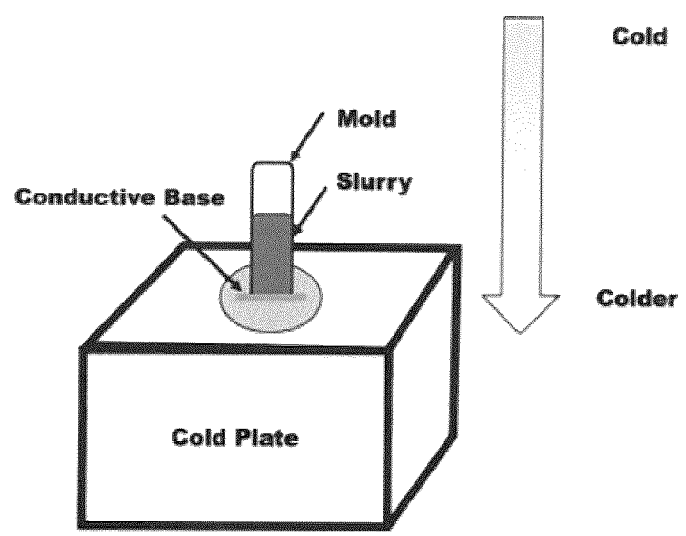
FIG. 2 is a schematic view of freezing in the method of producing the form-stable phase-change material of FIG. 1.

The slurry is frozen at 104. A schematic view of an apparatus for freezing in the method of producing the form-stable phase-change material is shown in FIG. 2. The slurry may be directionally frozen, for example, by pouring the slurry into a mold with a thermally conductive bottom, and directionally freezing, from the bottom up, on a cold plate or other device that provides a temperature gradient. Freezing in this manner, at a rate appropriate to the actual composition and conditions, creates unidirectional pillars of frozen solvent that force the suspended solid particles into the interstices. Freezing point-depressing additives may be utilized to regulate the morphology of solid solvent growth.

The frozen composite is then subjected to sublimation at 106 to remove the solid solvent, such as water in the form of ice. The frozen composite may be freeze-dried to remove the frozen solvent, leaving a green-body (proto scaffold). In the places where the solid solvent, such as ice, previously resided, vacancies remain. Optional structure modifying additives that are included in the slurry may influence the geometry of the solid solvent, e.g., planar, hexagonal, etc., and therefore modify the resulting pore geometry.

The green scaffold is then sintered at 108. The scaffold may be sintered in air or in an inert atmosphere, depending on the material, to strengthen and densify the solid, thereby forming a more rigid scaffold. If the scaffold is not sufficiently sintered, the scaffold may collapse under thermal cycling. Thus, appropriate preparation and sintering processes and conditions, including time, temperature, binding agents, etc., are determined for each scaffold material.

The form-stable phase-change structure is prepared at 110 by adding the phase-change material. To prepare a form-stable phase-change material, also referred to herein as a form-stable phase-change material (PCM) composite, the scaffold is heated to a temperature above the melting point of the phase-change material. Phase-change materials may include fatty acids, sugar alcohols, fatty alcohols, esters, polymers, paraffin waxes, salt hydrates, and others as well as combinations thereof. Molten PCM is added dropwise to the surface of the scaffold and the molten PCM is drawn into the scaffold by capillary action. The PCM may be added at atmospheric pressure. If the surface of the scaffold is not at a higher temperature than the melting point of the PCM, the PCM may crystallize on the surface of the scaffold and is therefore not fully absorbed. The addition of phase-change material is complete when the scaffold reaches saturation, and no further phase-change material is taken up.

Reference is now made to FIG. 3A through FIG. 3E, which illustrate the schematic production of the form-stable phase-change material.

Figures 3A, 3B, 3C, 3D, 3E:
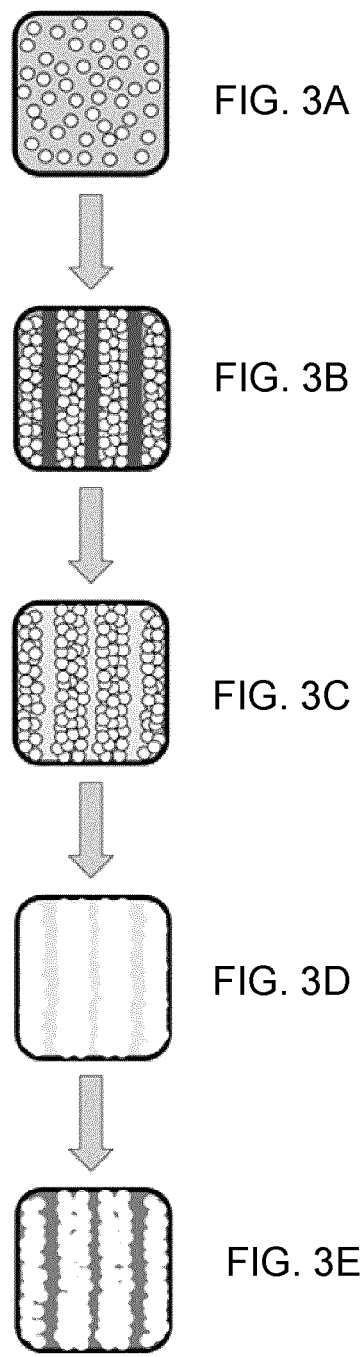
FIG. 3A through FIG. 3E are illustrations of the materials in the method of production of the form-stable phase-change material of FIG. 1.

The slurry is illustrated in FIG. 3A. As illustrated, the solid particles are suspended in a slurry. The slurry is frozen, starting at the bottom and at a controlled rate, creating regular frozen solvent structures. One example of such structures is shown in FIG. 3B. The frozen slurry is freeze-dried, removing all frozen solvent and leaving all other the solid particles, as illustrated in FIG. 3C. The scaffold is sintered for increased strength and densification as illustrated in FIG. 3D, and to remove any organic additives. The scaffold is infiltrated with PCM, providing the form-stable phase-change material as illustrated in FIG. 3E.

Figure 4:
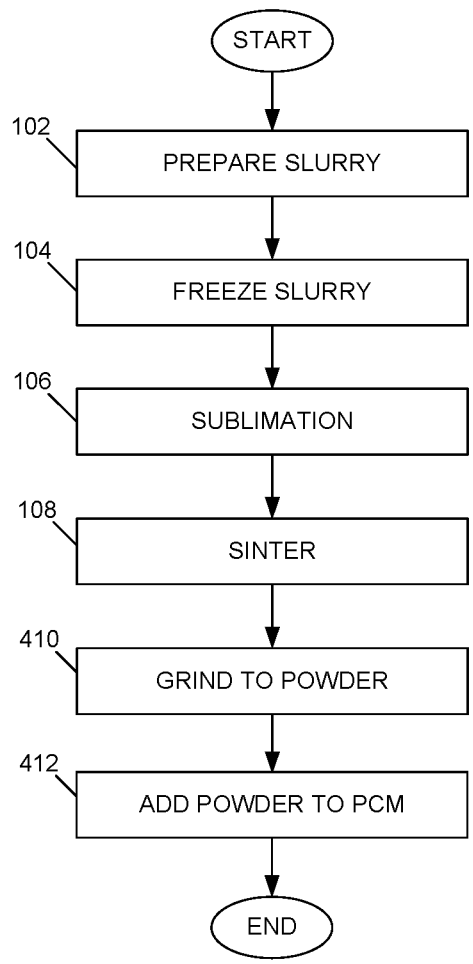
FIG. 4 is a simplified flow chart illustrating a method for producing a phase-change material according to another embodiment.

Reference is now made to FIG. 4 to describe a method producing a phase-change material in accordance with another embodiment. The method may contain additional or fewer processes than shown and described, and parts of the method may be performed in a different order. Rather than a form-stable phase-change material, a nucleating aid, also referred to as a nucleating agent, is produced and utilized for nucleating the phase-change material.

Many of the processes of the method of FIG. 4 are similar to those described above with reference to FIG. 1 and are therefore not described again in detail.

A freeze-cast scaffold is prepared from a slurry. The slurry is first prepared at 102. The slurry is frozen at 104 and the frozen composite is subjected to sublimation at 106 to remove the solid solvent, such as water in the form of ice. The green scaffold is sintered at 108.

The sintered scaffold is then ground to a powder and powder at 410. The powder is utilized as a nucleating aid in a phase-change material by mixing the powder into a molten phase-change material at 412. The powder is mixed in with the molten phase-change material, for example, about 5 wt. % or greater powder.

EXAMPLES

The following examples are submitted to further illustrate various embodiments of the present invention. These examples are intended to be illustrative only and are not intended to limit the scope of the present invention.

Form-stable (FS) phase-change materials (PCM) including a porous, solid scaffold, infiltrated with a PCM were produced by freeze-casting. Scaffolds were fabricated utilizing alumina, alumina and carbon, titania, carbon black, chitosan, and graphitized chitosan. It is expected that other ceramic materials, metals, polymers, and oxides are also suitable for such scaffolds. Laboratory experiments were carried out confirming that polymers and other oxides are suitable for making such scaffolds. Metal scaffolds are also suitable as metals are also susceptible to freeze-casting.

The scaffolds were successfully infiltrated with PCMs such as dodecanoic acid, which is solid at room temperature, octanoic acid, which is liquid at room temperature, erythritol, paraffin wax, sodium acetate trihydrate and polyethylene glycol. Water was utilized as the solvent. Other solvents may be successfully utilized, however.

Based on the PCMs utilized, other PCMs are also possible, including but not limited to other long-chain fatty acids, other sugar alcohols, long-chain alkanes, long-chain esters, long-chain fatty alcohols, long-chain fatty amides, various waxes, salt hydrates, and mono-, di-, and tri-glycerides.

Table 1 summarizes the scaffolds prepared to date. Table 2 summarizes the FS PCM compositions prepared, and properties for each. In addition, the Vicker's hardness of the alumina/dodecanoic acid FS PCM was determined to be 40.

TABLE 1

Freeze-cast Scaffolds

| Scaffold | Average Scaffold Density/g cm$^{-3}$ | Average Scaffold Porosity**/% |
|---|---|---|
| Alumina | 1.0 | 74 |
| Alumina + 1% Carbon | 0.82 | 79 |
| Alumina + 5% Carbon | 0.73 | 84 |
| Titania | 0.85 | 78 |
| Carbon Black | * | * |
| Chitosan | 0.044 | 85 |
| Graphitized Chitosan | 0.042 | 98 |

*Carbon scaffolds were too fragile to handle prior to filling with PCM, but could be handled with the PCM loaded.
**Scaffold porosity calculated relative to bulk density of scaffold (% porosity corresponds to volume fraction available for loading)

TABLE 2

Form-stable Phase-Change Material Compositions

| Scaffold | PCM | Average Loading/ $g_{PCM}$ cm$^{-3}$ | Average Density/g cm$^{-3}$ | Melting Temp./ °C | Crystallization Temp./ °C | Enthalpy of Fusion$^a$ /J cm$^{-3}$ | Thermal Conductivity (300K)$^b$/ W m$^{-1}$ K$^{-1}$ | Thermal Conductivity Enhancement Relative to PCM | Cycling$^c$ |
|---|---|---|---|---|---|---|---|---|---|
| Alumina | Dodecanoic Acid | 0.60 | 1.35 | 43 | 42 | 110 | 3.2 | 21.3× | 1000× |
| Alumina | Octanoic Acid | 0.63 | 1.75 | 14 | 8 | 80 | — | — | — |
| Alumina | Paraffin Wax | 0.44 | 1.60 | 65 | — | 70 | — | — | — |
| Alumina | Polyethylene Glycol | 0.64 | 1.85 | 25 | — | 82 | — | — | — |
| Alumina | Erythritol | 1.0 | 1.64 | 118 | 40-50 | 225 | — | — | — |
| Alumina | Octyl Butyrate | 0.38 | 1.76 | −55 | — | 40 | — | — | — |
| Alumina | Sodium Acetate Trihydrate | 0.74 | 2.19 | 58 | −66 | 170 | — | — | — |
| Titania | Dodecanoic Acid | 0.70 | 1.54 | 43 | 42 | 130 | — | — | — |
| Alumina + 1% Carbon | Erythritol | 0.87 | 1.80 | 118 | 40-50 | 280 | 1.48 | 2× | — |
| Alumina + 5% Carbon | Dodecanoic Acid | 0.75 | 1.40 | 43 | 42 | 120 | 1.85 | 12× | 250× |
| Carbon Black | Dodecanoic Acid | — | — | 43 | 42 | — | 0.30 | 2× | 250× |
| Chitosan | Dodecanoic Acid | 0.79 | 0.84 | 43 | 42 | 150 | 0.43 | 2.9× | — |
| Graphitized Chitosan | Dodecanoic Acid | 0.77 | 0.82 | 43 | 42 | 120 | 0.63 | 4.2× | 1000× |
| Graphitized Chitosan | Erythritol | 0.98 | 1.02 | 117<br>103-107$^d$<br>103-107$^e$ | 40-55<br>98-105$^d$<br>98-105$^e$ | 310 | — | — | — |

$^a$Experimental values
$^b$Measured
$^c$Number of times cycled with no change in stability (— indicates that this was not tried)
$^d$Scaffold treated with NaOH
$^e$Scaffold treated with NaOH, ground to powder, and added at 5% by mass Preparation of Scaffolds:
Alumina:

The proportions listed in the slurries prepared are reported as % mass of the entire slurry. Other proportions and compositions may also be successfully employed. Deionized water (37.8%), zirconium acetate (14.1%, based on 16% solution in dilute acetic acid, Aldrich) and sucrose (1.2%; >99%, BDH Chemicals) were mixed with a magnetic stir bar. Zirconium acetate was used to induce hexagonal-columnar growth of the ice. Sucrose was added to depress the melting point of the ice. The solution was then heated to 40° C., and polymethyl methacrylate (PMMA) (0.66%; 100 mesh, Aldrich) was added. PMMA was used to aid in the suspension of alumina particles in the slurry. Two particle sizes of alumina were then added, 0.25 to 0.45 μm (44.25%; 99.95%, Alfa Aesar) and 40 to 50 nm (1.9%; 99.5%, Alfa Aesar), and the slurry was stirred until the alumina powder was fully suspended. The slurry was poured into a copper-bottomed plastic mold. Two molds were utilized, having diameters of 11 mm and 7 mm and the molds were filled to a depth of 6 to 20 mm and frozen, directionally, bottom-up, on a Peltier-cooled cold plate. The frozen alumina bodies were then freeze-dried at ~−40° C. and ~2×10$^{−3}$ bar for 24 hours on an Edwards Modulyo freeze dryer. The green alumina pieces were heated to 500° C. in air at 5° C. min$^{−1}$ and held for 1 hour to burn off the organic compounds, then sintered for 2 hours at 1500° C.

Alumina+Carbon:

The slurries were prepared in the same manner as for alumina, except that an amount (1 or 5% by mass) of 0.5 to 0.45 μm alumina was substituted by an equivalent mass of carbon black (Black Pearls 2000). A different sintering process was also used: the green alumina+carbon pieces were heated at 5° C. min$^{−1}$ to 1500° C. under argon, and sintered for 2 hours.

Carbon Black:

Carbon slurries were prepared by mixing an aqueous PVA solution (24 g L$^{−1}$) (75.6%) with zirconium acetate (14.1%), and sucrose (1.2%). The solution was then heated to 40° C., and polymethyl methacrylate (PMMA) (0.8%; 100 mesh, Aldrich) was added. Carbon black (8.3%) was then added, and the solution was stirred until all the carbon was suspended. The slurry was poured into a copper-bottomed plastic mold (11 mm or 7 mm diameter, filled to a depth of 6 to 20 mm) and frozen, bottom-up, on a Peltier-cooled cold plate. The frozen bodies were then freeze-dried at ~−40° C. and ~2×10$^{−3}$ bar for 24 hours on an Edwards Modulyo freeze dryer.

Chitosan:

Chitosan gel was prepared by vigorously mixing deionized water (95.7%), chitosan (2.4%; Aldrich), and glacial acetic acid (1.9%). The gel was poured into a copper-bottomed plastic mold (11 mm or 7 mm diameter, filled to a depth of 6 to 20 mm) and frozen, bottom-up, on a Peltier-cooled cold plate. The frozen chitosan bodies were then freeze-dried at ~−40° C. and ~2×10$^{−3}$ bar for 24 hours on an Edwards Modulyo freeze dryer.

Graphitized Chitosan:

Prepared chitosan scaffolds were graphitized by heating at 5° C. min$^{-1}$ under argon to 800° C., and holding at that temperature for 3 hours.

Some of the samples of the graphitized chitosan scaffolds were saturated with 1 molar aqueous sodium hydroxide solution, held at 100° C. for 24 hours to functionalize the surface. The scaffolds were then rinsed with deionized water 5 times, and dried at 100° C. for 24 hours.

Other functionalized, graphitized chitosan scaffold samples were ground to a powder and added to the PCM as a nucleating aid.

Preparation of Form-Stable PCMs:

Scaffolds were prepared in two sizes: 11 mm diameter and 7 mm diameter. The lengths of the scaffold ranged from 6 mm to 20 mm, depending on the height to which the mold was filled for freeze-casting. To create form-stable PCMs, the chosen scaffold was heated to ~10° C. above the melting point of the PCM utilized, and molten PCM was added dropwise to the top surface of the scaffold, until no more could be absorbed. The FS PCM composite was then placed on its side, and held at 10° C. above the PCM melting point for 30 minutes to remove any PCM that had settled on the surface of the scaffold, without being absorbed.

The freeze-cast scaffolds produced receive phase-change materials and maintain their form over many thermal cycles. Thus, the resulting phase-change materials are useful for reversible thermal energy storage.

The scaffold materials were capable of receiving different phase-change materials. Thus, different phase-change materials may be selected for a scaffold material. The phase-change material is selected based on the application, to ensure that the melting point and crystallization temperature of the phase-change material fall within the temperature range of the application. Of those phase-change materials that are suitable based on the application, a phase change material having the highest thermal energy storage density may be selected by selecting phase-change materials with high enthalpy changes relative to the other phase-change materials, or by selecting scaffolds that achieve high phase-change material loading, which results in high enthalpy changes relative to scaffolds that are capable of a relatively lower phase-change material loading.

Of the PCMs studied, erythritol has the highest melting enthalpy change and chitosan and carbonized chitosan scaffolds had the highest loading. Alumina scaffolds provided the highest thermal conductivity enhancement, which is beneficial in applications in which thermal conductivity is important. Alumina scaffolds were also the most robust, which is beneficial in applications in which strength may be important. In applications in which hysteresis in melting temperature of the PCM is important, NaOH-treated carbonized chitosan scaffolds successfully reduced the hysteresis in some PCMs. Freeze-cast carbon scaffolds had relatively poor mechanical and thermal properties.

The above-described examples are intended to be illustrative only. Alterations, modifications, and variations may be effected to the particular examples by those skilled in the art. Thus, the scope of the claims should not be limited by the embodiments set forth in the examples, but should be given the broadest interpretation consistent with the description as a whole.

The invention claimed is:

1. A method for producing a form-stable phase-change material, the method comprising:
    directionally freezing a slurry of solid and solvent, providing a frozen slurry including unidirectional pillars of frozen solvent that force suspended solid particles into interstices;
    exposing the frozen slurry to conditions causing sublimation of the solvent of the frozen slurry to remove frozen solvent and provide a body having pillars of vacancies therein;
    sintering the body to provide a scaffold including the pillars of vacancies therein; and
    adding a molten phase-change material to the scaffold such that the molten phase-change material is drawn into the pillars of vacancies by capillary action to provide the form-stable phase-change material with increased thermal conductivity relative to the phase-change material.

2. The method according to claim 1, wherein exposing the frozen slurry to conditions causing sublimation comprises freeze-drying.

3. The method according to claim 1, wherein freezing comprises pouring the slurry into a mold and placing the mold on a cold plate to provide a temperature gradient during freezing.

4. The method according to claim 1, wherein the slurry includes a binder.

5. The method according to claim 1, wherein the slurry includes a structure modifying additive.

6. The method according to claim 1, comprising heating the scaffold while adding the molten phase-change material.

7. The method according to claim 1, wherein the temperature of the scaffold is greater than the melting point of the phase-change material when the molten phase-change material is added to the scaffold.

8. The method according to claim 1, wherein adding a molten phase-change material to the scaffold to provide the form-stable phase-change material comprises adding drops of molten phase-change material to the scaffold.

9. The method according to claim 1, wherein adding a molten phase-change material comprises adding the molten phase-change material until saturation of the scaffold.

10. The method according to claim 1, wherein the solid comprises at least one of a ceramic, a polymer, carbon, a pyrolyzed polymer, a metal, an oxide, or a combination thereof.

11. The method according to claim 1, comprising forming the slurry prior to freezing.

12. The method according to claim 11, wherein forming the slurry comprises at least one of stirring and planetary milling.

13. The method according to claim 12, wherein forming the slurry includes adding at least one binder, surfactant, dispersant, freezing point depressor, or structure modifier.

14. The method according to claim 1, wherein the phase-change material comprises at least one of a fatty acid, a sugar alcohol, an alkane, a fatty alcohol, a fatty amide, a fatty ester, a wax, polyethylene glycol, a salt hydrate and a mono-, di-, or tri-glyceride.

15. The method according to claim 1, wherein adding the molten phase-change material comprises adding the molten phase-change material at atmospheric pressure.

16. The form-stable phase-change material made by the method of claim 1.

* * * * *